US 012157347B2

(12) United States Patent
Morrison

(10) Patent No.: US 12,157,347 B2
(45) Date of Patent: Dec. 3, 2024

(54) TIME-BASED PULLDOWN AND PULLUP USING TRAJECTORY TRACKING AND BOX PARAMETER LEARNING

(71) Applicant: THERMO KING LLC, Minneapolis, MN (US)

(72) Inventor: Quinn Morrison, Minneapolis, MN (US)

(73) Assignee: THERMO KING LLC, Minneapolis, MN (US)

(*) Notice: Subject to any disclaimer, the term of this patent is extended or adjusted under 35 U.S.C. 154(b) by 45 days.

(21) Appl. No.: 17/828,880

(22) Filed: May 31, 2022

(65) Prior Publication Data

US 2023/0382196 A1 Nov. 30, 2023

(51) Int. Cl.
*B60H 1/32* (2006.01)

(52) U.S. Cl.
CPC ......... *B60H 1/3208* (2013.01); *B60H 1/3222* (2013.01)

(58) Field of Classification Search
None
See application file for complete search history.

(56) References Cited

U.S. PATENT DOCUMENTS

| | | | | |
|---|---|---|---|---|
| 10,703,174 | B2* | 7/2020 | Dykes | F25B 49/022 |
| 11,059,348 | B2* | 7/2021 | Yu | B60H 1/008 |
| 11,525,594 | B1* | 12/2022 | Hinson | F24F 11/64 |
| 2008/0083834 | A1* | 4/2008 | Krebs | F24F 11/65 |
| | | | | 237/2 A |
| 2010/0011789 | A1* | 1/2010 | Carlson | B60W 30/192 |
| | | | | 62/323.3 |
| 2015/0167999 | A1* | 6/2015 | Seem | F24F 11/64 |
| | | | | 700/276 |

(Continued)

FOREIGN PATENT DOCUMENTS

| | | |
|---|---|---|
| EP | 3017981 A2 | 5/2016 |
| FR | 2824788 A1 | 11/2002 |
| GB | 2595970 A | 12/2021 |

OTHER PUBLICATIONS

Extended European Search Report, European Patent Application No. 23175482.1, Nov. 2, 2023 (7 pages).

*Primary Examiner* — Nelson J Nieves
(74) *Attorney, Agent, or Firm* — HSML P.C.

(57) ABSTRACT

Control systems for time-based pulldown and/or pull-up operation of transport climate control systems include a controller receiving a time for pulldown or pull-up, with the controller modeling the conditioned space and determining a trajectory for efficiently completing the pulldown or pull-up according to the received time. The controller further operates the transport climate control system according to the determined trajectory. The controller can receive information from the conditioned space and adjust operations in order to bring the pulldown or pull-up closer to the determined trajectory. The model can be a dynamic model of the specific conditioned space in which the pulldown or pull-up is being performed. The controller can further determine when a pulldown or pull-up will be completed and provide notifications based on whether the pulldown or pull-up can be completed by a particular time. The model can be updated based on system dynamics observed during pulldown or pull-up.

20 Claims, 7 Drawing Sheets

(56) References Cited

U.S. PATENT DOCUMENTS

| | | | |
|---|---|---|---|
| 2015/0246591 A1* | 9/2015 | Ono | B60W 10/08 |
| | | | 180/65.265 |
| 2015/0300713 A1* | 10/2015 | Sun | F25B 49/02 |
| | | | 62/157 |
| 2015/0338135 A1* | 11/2015 | Satou | F25D 17/042 |
| | | | 62/228.1 |
| 2015/0352925 A1* | 12/2015 | Olyleye | B60H 1/00828 |
| | | | 62/203 |
| 2016/0334124 A1* | 11/2016 | Hou | A61B 5/4812 |
| 2017/0082335 A1 | 3/2017 | Jin et al. | |
| 2018/0251008 A1* | 9/2018 | Androulakis | B60N 2/5621 |
| 2021/0140664 A1* | 5/2021 | Roth | F24F 11/38 |
| 2022/0113053 A1* | 4/2022 | Harada | F24F 11/63 |
| 2023/0249539 A1* | 8/2023 | Li | B60H 1/0073 |
| | | | 701/49 |

* cited by examiner

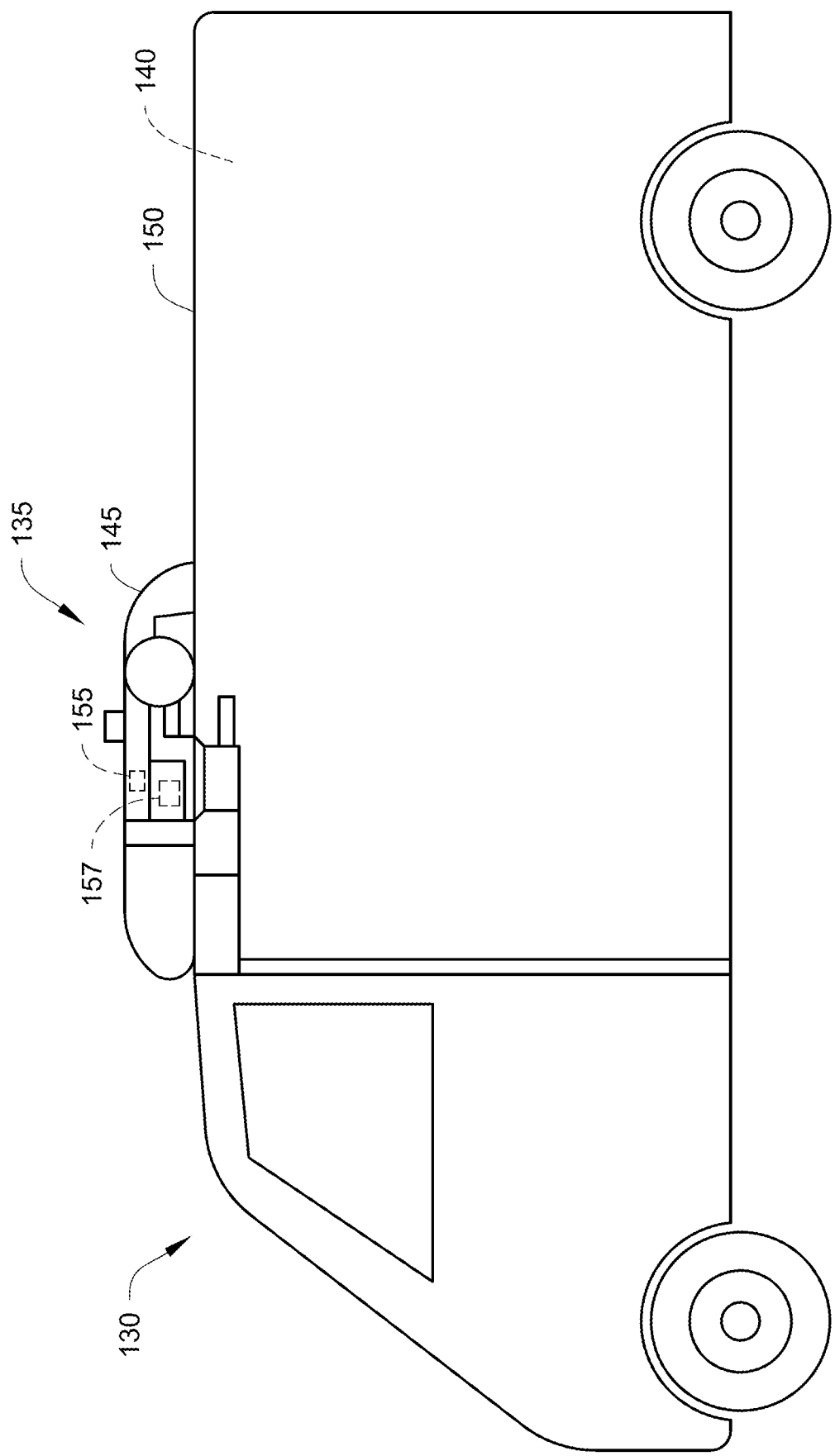

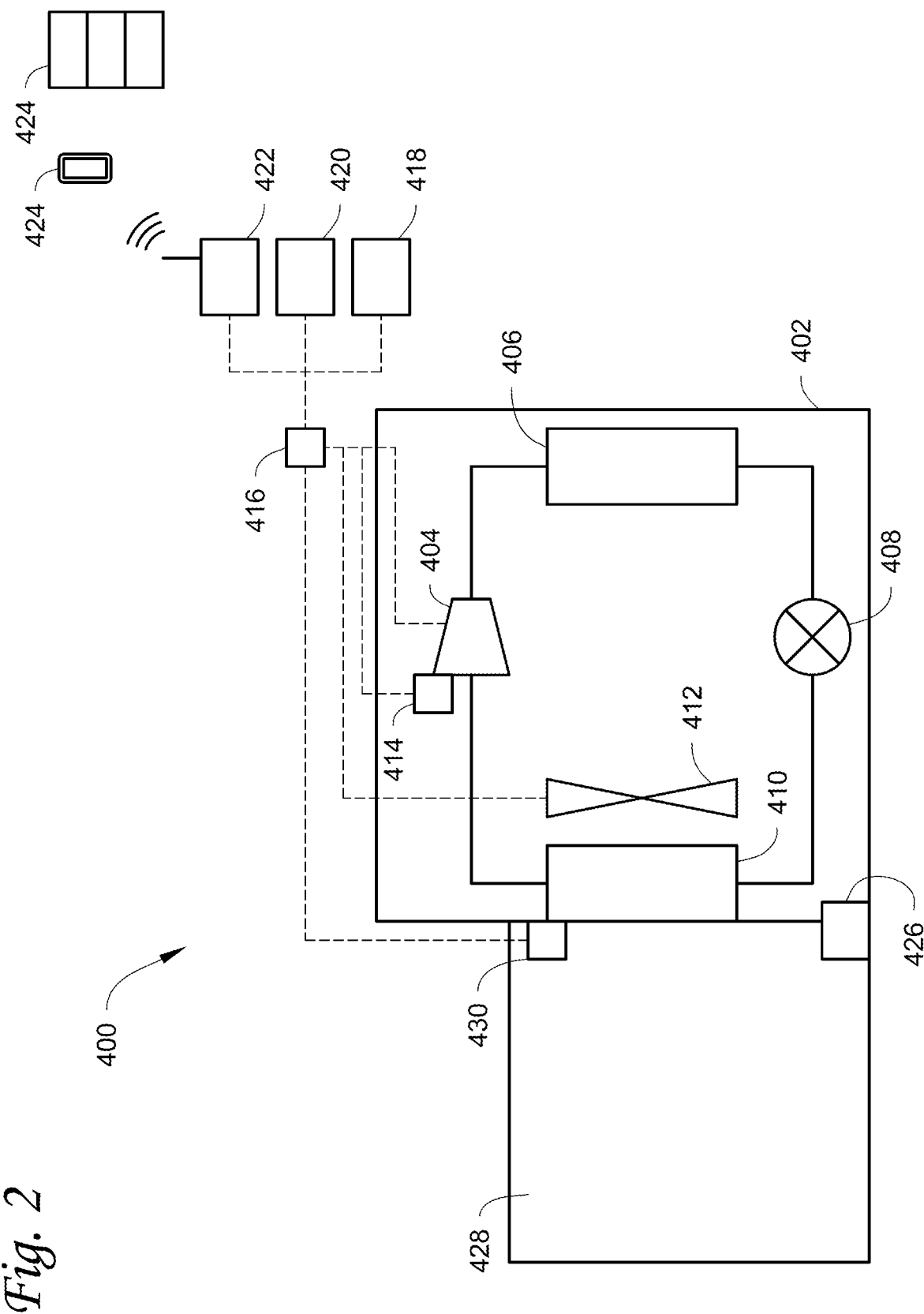

TIME-BASED PULLDOWN AND PULLUP USING TRAJECTORY TRACKING AND BOX PARAMETER LEARNING

FIELD

This disclosure is directed to transport climate control systems having timing-based control of pull-up or pulldown.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a conditioned space of a transport unit (e.g., a truck, a van, a container (such as a container on a flat car, an intermodal container, etc.), a box car, a semi-tractor, a mass-transit vehicle such as a passenger bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

The energy required to pull a temperature up or down in a conditioned space can vary depending on the speed at which the temperature is being changed, particularly for climate control systems having variable operation speeds. However, such energy efficient pulldown/pull-up operations can be difficult to manage due to uncertainty in the time to complete the pulldown/pull-up operation and/or the extent of energy savings realized through such pulldowns/pull-ups. When a pulldown/pull-up operation is completed too early, unnecessary energy may be spent maintaining the target temperature prior to use of a transport unit, such as beginning a delivery route. When a pulldown/pull-up operation is not completed on time, it may delay the use of the transport unit, putting routes and schedules at risk.

SUMMARY

This disclosure is directed to transport climate control systems having timing-based control of pull-up or pulldown.

By controlling the trajectory of temperature over time during a pulldown/pull-up of a conditioned space based on available time, the energy efficiency of pulldown/pull-up operations can be improved. Accordingly, the amount of time spent at maximum capacity and by reducing or eliminating time spent maintaining a target temperature prior to the transport unit going into service can be reduced. The control of trajectory can be based on a model of a specific conditioned space, such as a particular truck, van, trailer, bus, cargo compartment of a transport unit, or the like, to ensure accuracy in the control of the pulldown/pull-up trajectory and timely satisfaction of the target temperature within the desired time.

In an embodiment, a method of controlling a transport climate control system includes receiving a time parameter for a pulldown or pull-up operation of the transport climate control system. The method further includes determining a pulldown or pull-up trajectory based on a model of a conditioned space of the transport climate control system and the time parameter. The method also includes operating the transport climate control system based on the determined pulldown or pull-up trajectory to perform the pulldown or pull-up operation.

In an embodiment, the method further includes determining an estimated completion time for the pulldown or pull-up operation. In an embodiment, the method further includes directing the presentation of a notification when the estimated completion time is later than the time parameter. In an embodiment, the method further includes delaying the operating of the transport climate control system when the estimated completion time is earlier than the time parameter.

In an embodiment, a system for controlling temperature pulldown or pull-up of a conditioned space includes a transport climate control system configured to affect a temperature of a conditioned space of a transport unit and a controller. The controller is configured to receive a time parameter for a pulldown or pull-up operation for the conditioned space. The controller is also configured to determine a pulldown or pull-up trajectory based on a model of the conditioned space and the time parameter. The controller is further configured to direct operation of the transport climate control system based on the determined pulldown or pull-up trajectory so as to perform the pulldown or pull-up operation.

In an embodiment, the controller is further configured to determine, based on the model of the conditioned space, an estimated completion time for the pulldown or pull-up operation. In an embodiment, the controller is further configured to direct presentation of a notification to a user when the estimated completion time is later than the time parameter. In an embodiment, the controller is further configured to delay operation of the transport climate control system when the estimated completion time is earlier than the time parameter.

In an embodiment, the controller is further configured to receive temperature data from the conditioned space during the pulldown or pull-up operation. In an embodiment, the controller is further configured to adjust the pulldown or pull-up trajectory based on the received temperature data. In an embodiment, the controller is further configured to update the model of the conditioned space based on the received temperature data.

In an embodiment, directing the operation of the transport climate control system includes setting a speed for a compressor included in the transport climate control system.

In an embodiment, directing the operation of the transport climate control system includes setting a speed for a fan of an evaporator included in the transport climate control system.

In an embodiment, the determining of the pulldown or pull-up trajectory is further based on at least one ambient condition of the conditioned space.

In an embodiment, the conditioned space is an interior of a trailer. In an embodiment, the conditioned space is a cargo compartment of a truck. In an embodiment, the conditioned space is a passenger compartment of a bus.

In an embodiment, the method further includes receiving temperature data from the conditioned space during the pulldown or pull-up operation. In an embodiment, the method further includes adjusting the pulldown or pull-up trajectory based on the temperature data. In an embodiment, the method further includes updating the model of the conditioned space based on the temperature data.

DRAWINGS

FIG. 1B illustrates a side view of a van with a transport climate control system, according to an embodiment.

FIG. 2 shows a system diagram for an embodiment.

DETAILED DESCRIPTION

Figure 1A:
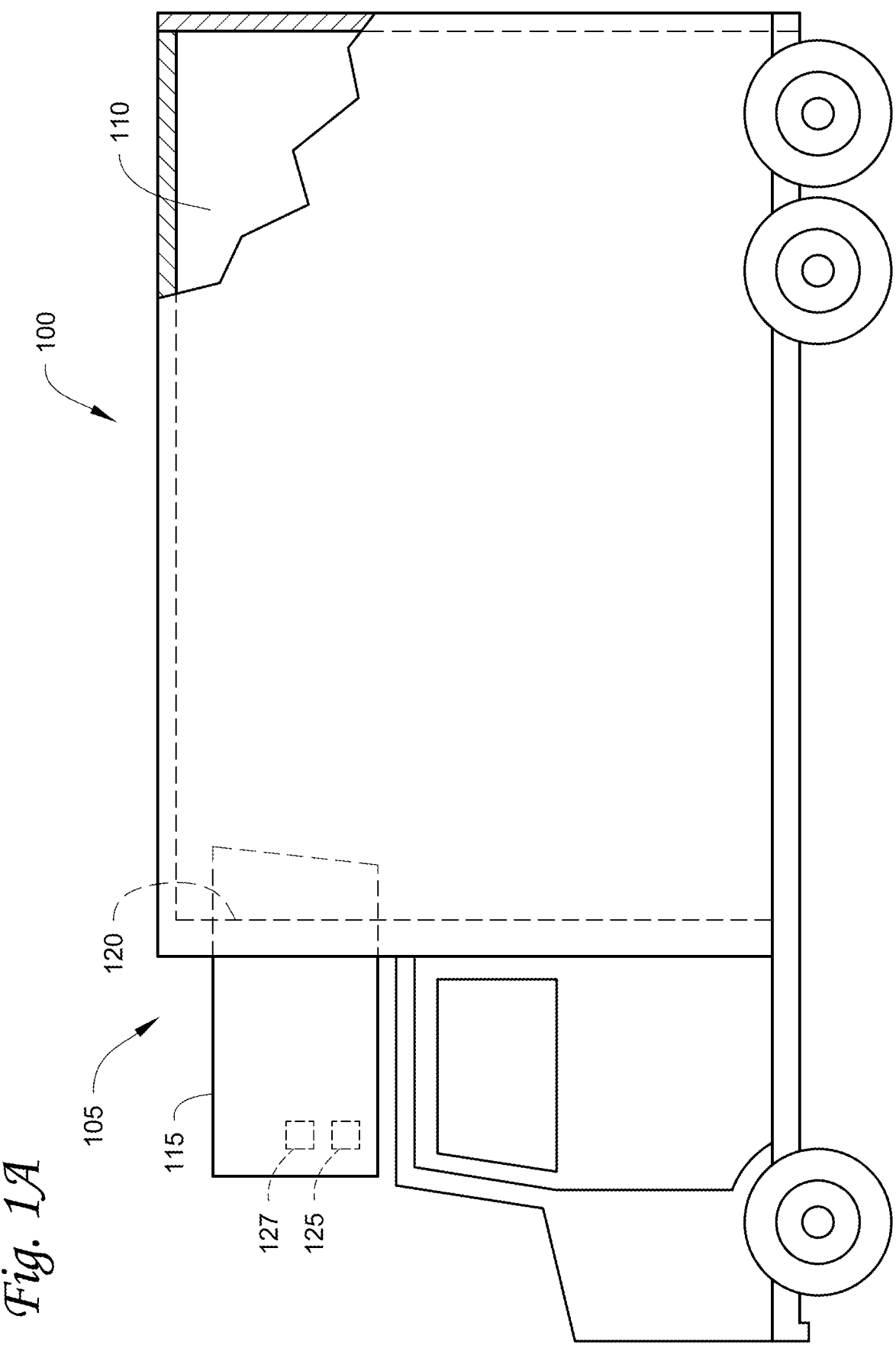
FIG. 1A illustrates a side view of a truck with a transport climate control system, according to one embodiment.

This disclosure is directed to transport climate control systems having timing-based control of pull-up or pulldown.

Transport climate control systems can perform pull-up or pulldown operations on conditioned spaces. A pull-up operation can include heating the conditioned space from an initial condition to a target temperature or within a target range of temperatures. A pulldown operation can include cooling the conditioned space to a target temperature or within a target range of temperatures. The initial condition can be a state of the conditioned space without operation of the transport climate control system, a state of the conditioned space when the transport climate control system has been operating in a standby or maintenance mode, or the like.

A pull-up or pulldown operation can occur, for example, when the transport unit is preparing to begin a route to one or more destinations. For example, a pull-up or pulldown operation can occur prior to loading a transport unit to ensure that the climate controlled space within the transport unit is at or near a desired setpoint temperature while in transit. This can occur while the transport unit is at a distribution center, a fleet yard, a shipyard, a warehouse, a supply yard, a farm, a manufacturing/production facility, a retail store, a loading dock, a warehouse, etc. Once the pull-up or pulldown operation is complete, the transport climate control system can operate to maintain the desired climate (e.g., temperature) within the climate controlled space.

A transport climate control system is generally used to control one or more environmental conditions such as, but not limited to, temperature, humidity, air quality, or combinations thereof, of a transport unit. Examples of transport units include, but are not limited to a truck, a van, a container (such as a container on a flat car, an intermodal container, etc.), a box car, a semi-tractor, a mass-transit vehicle such as a passenger bus, or other similar transport unit. A climate controlled transport unit can be used to transport perishable items such as pharmaceuticals, produce, frozen foods, and meat products and/or can be used to provide climate comfort for passengers in a passenger space of a mass-transit vehicle. The transport climate control system may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system can include, for example, a vapor compression refrigeration system, a cryogen based refrigeration system, a eutectic based refrigeration system, a heat plate refrigeration system, etc.

A transport climate control system can include a climate control unit (CCU) attached to a transport unit to control one or more environmental conditions (e.g., temperature, humidity, air quality, etc.) of a climate controlled space of the climate controlled transport unit. The CCU can include, without limitation, a climate control circuit (including, for example, a compressor, a condenser, an expander (e.g., expansion valve), and an evaporator), and one or more fans or blowers to control the heat exchange between the air within the climate controlled space and the ambient air outside of the climate controlled transport unit. As defined herein, an expander can be an expansion valve or any other type of expander that is configured to control an amount of working fluid passing there through and thereby regulate the superheat of vapor leaving an evaporator.

A climate controlled transport unit (e.g., a transport unit including a transport climate control system) can be used to transport human passengers, other animals, and/or perishable items such as, but not limited to, pharmaceuticals, biological samples produce, frozen foods, and meat products.

Figure 1C:
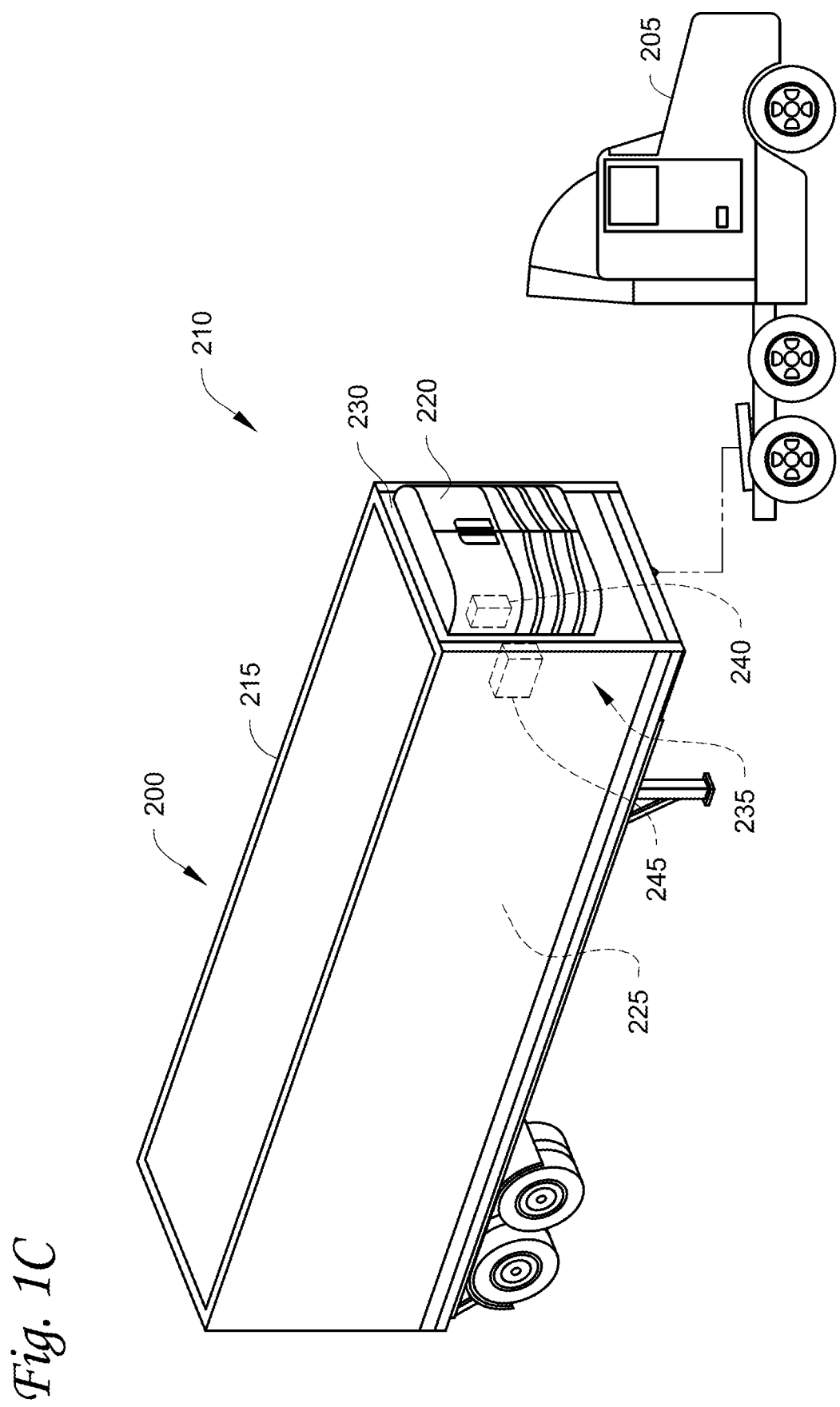
FIG. 1C illustrates a perspective view of a climate controlled transport unit with a transport climate control system that is attached to a tractor, according to one embodiment.
Figure 1D:
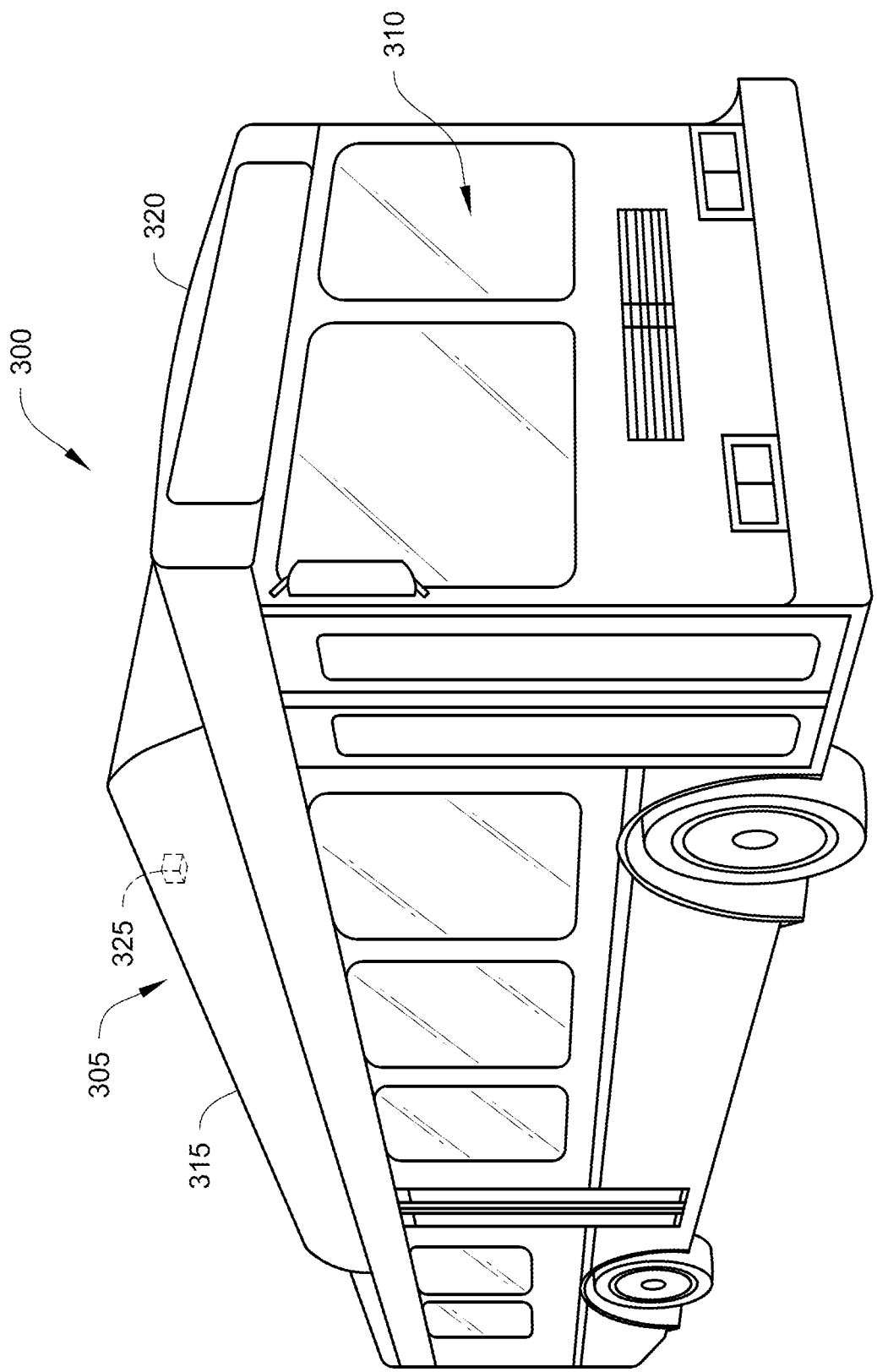
FIG. 1D illustrates a perspective view of a mass-transit vehicle including a transport climate control system, according to one embodiment.

FIGS. 1A-D show various embodiments of a transport climate control system. FIG. 1A is a side view of a truck 100 with a transport climate control system 105, according to an embodiment. FIG. 1B is a side view of a van 130 with a transport climate control system 135, according to an embodiment. FIG. 1C is a perspective view of a climate controlled transport unit 200 attachable to a tractor 205, according to an embodiment. The climate controlled transport unit 200 includes a transport climate control system 210. FIG. 1D is a perspective view of a climate controlled mass-transit vehicle 300 with a transport climate control system 305, according to an embodiment.

FIG. 1A depicts the climate controlled straight truck 100 that includes the climate controlled space 110 for carrying cargo and the transport climate control system 105. The transport climate control system 105 can include, among other components, a climate control circuit that connects, for example, a compressor, a condenser, an evaporator, and an expander (e.g., an expansion valve or other expansion devices) to provide climate control within the climate controlled space 110.

The transport climate control system 105 includes a CCU 115 that is mounted to a front wall 120 of the climate controlled space 110. The CCU 115 can include, for example, the compressor, the condenser, the evaporator, and the expander. In an embodiment, the CCU 115 can be a transport refrigeration unit.

The transport climate control system 105 also includes a programmable climate controller 125 and one or more climate control sensors that are configured to measure one or more parameters of the transport climate control system 105 (e.g., an ambient temperature outside of the truck 100, an ambient humidity outside of the truck 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate climate control data to the climate controller 125. The one or more climate control sensors can be positioned at various locations outside the truck 100 and/or inside the truck 100 (including within the climate controlled space 110).

The climate controller 125 is configured to control operation of the transport climate control system 105 that may include a single integrated control unit 125 or may include a distributed network of climate controller elements 125, 127. The number of distributed control elements in a given network can depend upon the particular application of the principles described herein. The measured parameters obtained by the one or more climate control sensors can be used by the climate controller 125 to control operation of the transport climate control system 105.

FIG. 1B depicts the van 130 having the transport climate control system 135 for providing climate control within a climate controlled space 140. The transport climate control system 135 includes a climate control unit ("CCU") 145 that is mounted to a rooftop 150 of the van 130. In an embodiment, the CCU 145 can be a transport refrigeration unit.

The transport climate control system 135 can include a climate control circuit that connects, for example, a compressor, a condenser, an evaporator, and an expander (e.g., an expansion valve or other expansion devices) to provide climate control within the climate controlled space 140.

The transport climate control system 135 also includes a programmable climate controller 155 and one or more climate control sensors that are configured to measure one or more parameters of the transport climate control system 135 (e.g., an ambient temperature outside of the van 130, an ambient humidity outside of the van 130, a compressor suction pressure, a compressor discharge pressure, a supply air temperature of air supplied by the CCU 145 into the climate controlled space 140, a return air temperature of air returned from the climate controlled space 140 back to the CCU 145, a humidity within the climate controlled space 140, etc.) and communicate the measured parameters to the climate controller 155. The one or more climate control sensors can be positioned at various locations outside the van 130 and/or inside the van 130 (including within the climate controlled space 140).

The climate controller 155 is configured to control operation of the transport climate control system 135. The climate controller 155 may include a single integrated control unit 155 or may include a distributed network of climate controller elements 155, 157. The number of distributed control elements in a given network can depend upon the particular application of the principles of this disclosure. The measured parameters obtained by the one or more climate control sensors can be used by the climate controller 155 to control operation of the transport climate control system 135.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 200 can include a climate control circuit that connects, for example, a compressor, a condenser, an evaporator, and an expander (e.g., an expansion valve or other expansion devices) to provide climate control within the climate controlled space 225.

The transport climate control system 210 includes a CCU 220. The CCU 220 is disposed on a front wall 230 of the transport unit 215. In other embodiments, it will be appreciated that the CCU 220 can be disposed, for example, on a rooftop or another wall of the transport unit 215. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate controlled space 225).

The climate controller 235 is configured to control operation of the transport climate control system 210 including components of the climate control system 210. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the transport climate control system 210.

FIG. 1D is a perspective view of a mass-transit vehicle 300 including a transport climate control system 305, according to one embodiment. In the embodiment illustrated in FIG. 1D, the mass-transit vehicle 300 is a mass-transit bus that can carry passenger(s) (not shown) to one or more destinations. In other embodiments, the mass-transit vehicle 300 can be a school bus, railway vehicle, subway car, or other commercial vehicle that carries passengers. Hereinafter, the term "vehicle" shall be used to represent all such mass-transit vehicles, and should not be construed to limit the scope of the application solely to passenger buses. The transport climate control system 305 can provide climate control within a climate controlled space which in this embodiment is a passenger compartment 310.

The transport climate control system 305 includes a climate control unit ("CCU") 315 that is mounted to a rooftop 320 of the mass-transit vehicle 300. In an embodiment, the CCU 315 can be a HVACR unit. The climate control system 305 also includes a programmable climate controller 425 and one or more sensors (not shown) that are configured to measure one or more parameters of the transport climate control system 305 (e.g., an ambient temperature outside of the mass-transit vehicle 300, a controlled space temperature within the passenger compartment 310, an ambient humidity outside of the mass-transit vehicle 300, a controlled space humidity within the passenger compartment 310, etc.) and communicate parameter data to the climate controller 325.

The transport climate control system 305 can include, among other components, a transport climate control circuit (not shown) that connects, for example, a compressor, a condenser, an evaporator, and an expander (e.g., an expansion valve or other expansion devices) to provide climate control within the passenger compartment 310.

The climate controller 325 may comprise a single integrated control unit or may comprise a distributed network of climate controller elements (not shown). The number of distributed control elements in a given network can depend upon the particular application of the principles described herein. The climate controller 325 is configured to control operation of the climate control system 305 including the transport climate control circuit.

It will be appreciated that the transport climate control systems 105, 135, 210, 305 described above with respect to FIGS. 1A-1D can operate in multiple operating modes including, for example, a continuous cooling mode, a start/stop cooling mode, a heating mode, a fan only mode, a null mode, a pre-conditioning mode, a dry-out mode, and a defrost mode, etc. In some embodiments, the transport climate control systems can also have a plurality of operational settings having varying capacity to affect the climate (e.g., temperature) within the climate controlled spaces 110, 140, 225, 310. In some embodiments, the transport climate control systems 105, 135, 210, 305 have a continuously variable capacity to affect the climate (e.g., temperature) within the climate controlled spaces 110, 140, 225, 310. In some embodiments, the transport climate control systems can include a heater, such as, as a non-limiting example, an electric heater.

Also, the transport climate control systems 105, 135, 210, 305 shown in FIGS. 1A-1D can include a prime mover, an electric motor, or the like to drive the compressor. In some embodiments, the transport climate control systems 105, 135, 210, 305 can be powered by a power system of the vehicle (e.g., the truck 100, the van 130, the tractor 205, the mass-transit vehicle 300). In some embodiments, the transport climate control systems 105, 135, 210, 305 can include its own power system, for example including one or more of a prime mover, rechargeable energy source, a motor, a generator, an alternator, or the like.

The climate controllers 125, 155, 235, 325 shown in FIGS. 1A-D can be configured to receive a time parameter. The time parameter can be a time within which a transport climate control system is to pull a temperature of at least a portion of a climate controlled space to a target temperature or range of temperatures. The target temperature or range of temperatures can include a setpoint temperature determined by or provided to the climate controller 125, 144, 235, or 325. Pulling the temperature of the climate controlled space to the target temperature or range of temperatures can be through a pulldown operation when cooling is required to reach the target temperature or range of temperatures, or through a pull-up operation when heating is required to reach the target temperature or range of temperatures. The time parameter can be a duration of time in which the pulldown or pull-up operation is to be completed, a predetermined time of day at which the pulldown or pull-up operation is to be completed by, or the like. The climate controllers 125, 155, 235, 325 are configured to determine a trajectory for the pulldown or pull-up operation. The trajectory can be determined based on parameters including a model of the climate controlled space and operation characteristics of the transport climate control system. In an embodiment, the determination of the trajectory includes estimating parameters of the model based on observed temperature data. Additional parameters used in determining the trajectory can include, for example, ambient conditions outside of the climate controlled transport unit (e.g., the truck 110, the van 130, the transport unit 215, the mass-transit vehicle 230, etc.) such as temperature, wind, solar intensity, or the like. (Any other optional parameters?) The climate controllers 125, 155, 235, 325 can be further configured to direct operation of the transport climate control systems 105, 135, 210, 305 based on the determined trajectory.

FIG. 2 shows a system diagram for a temperature pulldown/pull-up system according to an embodiment. Pulldown/pull-up system 400 includes transport climate control system 402. Pulldown/pull-up system 400 can be incorporated into a transport unit, with non-limiting examples of such including truck 100, van 130, transport unit 215 and bus 300 as described above and respectively shown in FIGS. 1A-D. Pulldown/pull-up system 400 controls the pulling down or up of temperatures within a conditioned space 428. This can be, for example, when the transport unit is preparing to begin a route to one or more destinations. The conditioned space 428 can be, for example, any of the climate controlled spaces 110, 140, 225, 310 as described above and respectively shown in FIGS. 1A-D. The transport climate control system 402 includes a climate control circuit configured to condition (e.g., heat, cool, etc.) a conditioned space 428. System 400 further includes a controller 416. In an embodiment, pulldown/pull-up system 400 can optionally include an input device 418, an output device 420, and/or a remote device interface 422. Remote device interface 422 can be configured to communicate with a remote device 424. Pulldown/pull-up system 400 can optionally further include a heater 426.

The transport climate control system 402 includes a compressor 404, a condenser 406, an expander 408, an evaporator 410, one or more fans/blowers 412, etc. The compressor 404 can optionally be driven by a variable-frequency drive 414 configured to output a drive signal to a motor of the compressor 404 so as to operate the compressor 404 at a particular speed or capacity level. That is, the variable-frequency drive 414 can allow the compressor 404 to operate as a variable speed compressor capable of operating at a plurality of different non-zero speeds. Compressor 404 is configured to compress a working fluid (e.g., refrigerant). Compressor 404 can be any suitable type of compressor for use in transport climate control system 402. Compressor 404 can be operated at a plurality of operating speeds or capacities, or within a continuous range of operating speeds or capacities. In an embodiment, compressor 404 is an electrically powered compressor. In an embodiment, variable-frequency drive 414 can be used to operate the compressor at a specific speeds or capacities. Working fluid from compressor 404 can reject heat at condenser 406. Condenser 406 can be a heat exchanger configured to allow heat exchange with an ambient environment of transport climate control system 402. The working fluid from condenser 406 can then be expanded at expander 408. Expander 408 can be any suitable expander such as an orifice plate, an expansion valve, or the like. The working fluid expanded at expander 408 can then pass to evaporator 410. At evaporator 408, the working fluid absorbs heat from air that is distributed to the conditioned space 428. One or more fans 414 can be provided at or near the evaporator 410 to draw or drive air over the evaporator 410 and then into conditioned space 428 such that the air cools the conditioned space 428. In an embodiment, the fans/blowers 412 can be configured to be operated at a plurality of different speeds or over a continuous range of speeds. The speed of the fans/blowers 412 can affect the cooling of conditioned space 428 and/or the capacity at which transport climate control system 402 is operated.

Controller 416 is configured to control transport climate control system 402. Controller 416 can include any suitable number and arrangement of memories, processors, and the like. Controller 416 can control the transport climate control system 402 according to a trajectory for a pulldown or pull-up operation for the conditioned space 428. The controller 416 is configured to receive a time parameter for the pulldown or pull-up operation. The time parameter can be, for example, a period of time over which the pulldown or pull-up operation is to be completed or a specific time by which the pulldown or pull-up operation is to be completed. The time parameter can be provided by a user input, a command from a telematics and/or fleet management system, or any other suitable scheduling of pulldown or pull-up operations. Based on the time parameter, the controller 416 can determine the trajectory for the pulldown or pull-up operation. The trajectory can further be based on a model of the conditioned space. The model can be a static or a dynamic model of the conditioned space 428 and its response to heating or cooling by the transport climate control system 402. In an embodiment, the model can be represented by an equation, such as the following first-order ordinary differential equation:

$$\Delta Q = Q_{in} - Q_{out}$$

$$C_{box} \dot{T}_{box} = Q_{reefer} - UA(T_{box} - T_{ambient})$$

The solution to the first-order differential equation model for temperature at a particular time thus is:

$$T_{box}(t) = T_{ambient} - \frac{Q_{reefer}}{UA}(1 - e^{\frac{-UAt}{C_{box}}})$$

Where: $T_{box}(0) = T_{ambient}$, and $\lim_{t \to \infty} T(t) = T_{ambient} + \frac{Q_{reefer}}{UA}$ In the above equations, the symbols represent the following:
T—Temperature
ΔT—Temperature difference
$T_{Amb}$—Ambient temperature
τ—Exponential time constant
t—Time
Q—Heating or Cooling, heat flux
UA—Heat transfer coefficient times area (represents how easily heat is transferred into/out of the box)
$C_{box}$—Heat capacity of the conditioned space The model can incorporate conditions at a transport unit including the system 400, such as truck 100, van 130, transport unit 215 and bus 300 as discussed above and respectively shown in FIGS. 1A-D. The conditions at the transport unit can include, as non-limiting examples, one or more of ambient temperature, wind, solar intensity, and the like. The determined trajectory represents the process by which the conditioned space can be pulled down or up to a target temperature or range of temperatures within the period of time defined by the time parameter. The trajectory can be determined through solving the model for heat flux at the conditioned space, which is related to the operational setting of the transport climate control system 402. The trajectory can be determined based on energy efficiency over the course of completing the pulldown or pull-up operation according to the time parameter, using relationships between the operational setting of transport climate control system 402 and energy consumption thereof. Energy efficiency can further be improved by preventing the system from arriving at the target temperature or range of temperatures prematurely. Energy efficiency can be improved by avoiding maximization of compressor or engine operation during the trajectory for the pulldown or pull-up operation. The controller 416 can further determine whether the pulldown or pull-up operation can be completed in accordance with the time parameter, and direct a notification to be presented, for example at output device 420 and/or a remote device 424 when the pulldown or pull-up operation cannot be completed in accordance with the time parameter. The controller 416 can operate heater 426, transport climate control system 402, or particular elements thereof such as compressor 404 and/or fans 412 to implement the pulldown or pull-up operation according to the determined trajectory, for example by controlling a speed or capacity at which compressor 404 is operated, or controlling a speed at which fans 414 are operated.

In an embodiment, the controller 416 can receive data regarding temperature in the conditioned space during the pulldown or pull-up operation. In an embodiment, the temperature data is return air temperature data from a return air temperature sensor 430 included in transport climate control system 402. In an embodiment, controller 416 can update the determined trajectory during the performance, for example adjusting the trajectory to improve efficiency or achieve completion in accordance with the time parameter when the changes in temperature in conditioned space 428 deviate from the determined trajectory. In an embodiment, data obtained during the pulldown or pull-up operation can be used to update the model used by controller 416. In an embodiment, the controller 416 updates the model of the conditioned space 428 based on the data obtained during the pulldown or pull-up operation. In an embodiment, the model is updated at a remote device 424 and the updated model is communicated to the controller 416.

Input device 418 can optionally be used to allow a user to provide the time parameter to the controller 416. Input device 418 can include, for example, a display for prompting input of the time parameter, and structure for receiving input of the time parameter such as a keyboard, a touch-screen, a microphone, or any other suitable input device. The time parameter can be provided as a direct input from to input device 418 a user such as a vehicle operator. In some embodiments, the input device 418 can be a human machine interface (HMI) provided for the transport climate control system 402.

Output device 420 can optionally be used to provide notifications to a user such as a vehicle operator. The output device 420 can be, for example, a display, a speaker, or any other suitable device for providing a notification to the user. The notification can include, for example, notification that a certain time parameter may not be able to be satisfied for a pulldown or pull-up operation, an estimate of a time for completion of a pulldown or pull-up operation, recommendations to improve efficiency, prompts for accepting and/or initiating a pulldown or pull-up operation or any other suitable communication to the user regarding a pulldown or pull-up operation being directed by the controller 416. In some embodiments the output device 420 and the input device 418 can be part of the same device (e.g., HMI of the transport climate control system 402).

Remote device interface 422 can optionally be used to communicate with a remote device 424. The remote device interface can include a wireless communications antenna configured to communicate with remote device 424 by way of, as non-limiting examples, BLUETOOTH™, 802.11 Wi-Fi, a mobile internet connection such as 3G, 4G, or 5G cellular data or other such standards and using corresponding hardware. In some embodiments the remote device interface 4222, the output device 420, and the input device 418 can be part of the same device (e.g., HMI of the transport climate control system 402).

Remote device 424 can be any suitable device capable of communicating remote device interface 422. In an embodiment, remote device 424 can be a mobile device such as a smartphone, tablet, or the like. In an embodiment, remote device 424 can be a server, such as a cloud server, a server of a telematics and/or fleet management system, a weather data server, or the like. In an embodiment, remote device 424 can accept input of or generate the time parameter, for example through a user interface, referencing of schedules in a telematics and/or fleet management or other enterprise system, or the like. In an embodiment, remote device 424 can receive a notification or command generated by controller 416, such as a notification that the pulldown or pull-up operation cannot be completed according to the time parameter.

Heater 426 can optionally be included in system 400 in embodiments where the conditioned space 428 may also be heated. In an embodiment, the heater 426 is included in the transport climate control system 402. Heater 426 can be operated at a plurality of discrete settings such as low-medium-high, numbered settings, or the like, or over a continuous range of heating capacities. The operation of heater 426 can be controlled by controller 416 according to a trajectory for heating of the conditioned space 428 over time. The trajectory can be determined by controller 416 based on a time parameter within which to conduct a pull-up operation for a temperature of the conditioned space 428. The capabilities of heater 426 can be included in the model of the conditioned space 428 used to determine the trajectory for a pull-up operation. Heater 426 can be operatively connected to controller 416 such that controller 416 can direct the operation of heater 426, for example to operate heater 426 in accordance with a determined trajectory for a pull-up operation for the conditioned space 428.

Figure 3:
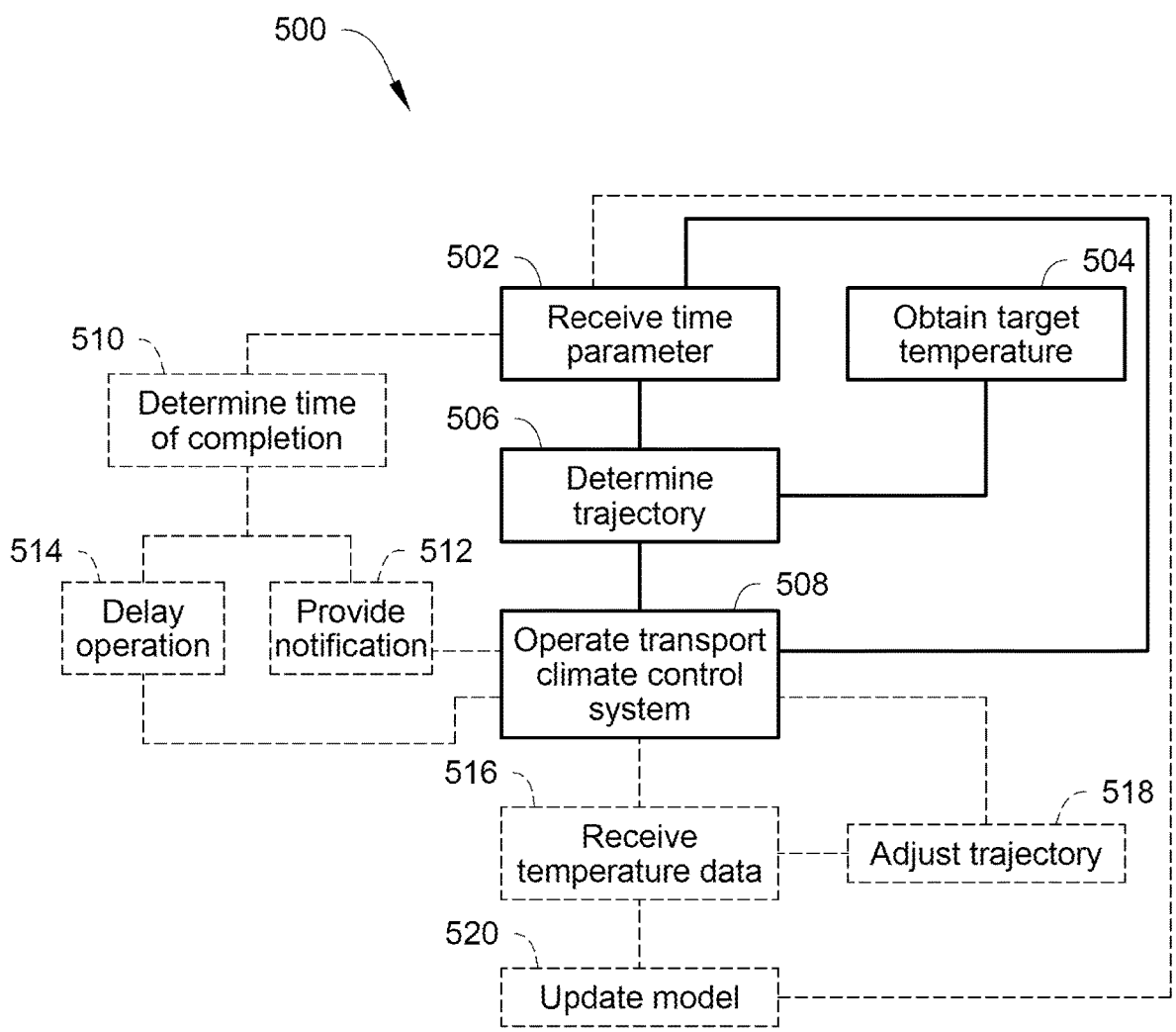
FIG. 3 shows a flowchart of a method according to an embodiment.

FIG. 3 shows a flowchart of a method for pulling a temperature of a conditioned space down or up according to an embodiment. Method 500 includes receiving a time parameter 502, obtaining a desired temperature or range of temperatures 504, determining a pulldown or pull-up trajectory 506, and operating a transport climate control system to perform a pulldown or pull-up operation according to the determined trajectory 508. Method 500 can optionally further include determining an estimated completion time for the pulldown or pull-up operation 510. In an embodiment, method 500 further includes directing the presentation of a notification based on the estimated completion time 512. In an embodiment, method 500 further includes controlling a starting time for the operation of the transport climate control system 514. The method 500 can optionally include receiving temperature data from the conditioned space during the pulldown or pull-up operation 516. In an embodiment, the method 500 can include adjusting the pulldown or pull-up trajectory 518. In an embodiment, the method 500 can include updating a model of the conditioned space 520.

A time parameter is received at 502. The time parameter is received by a controller, such as controller 416 described above and shown in FIG. 4. The time parameter can be any suitable definition of time within which a pulldown or pull-up operation is to be completed. In an embodiment, the time parameter received at 502 is a specific time by which the pulldown or pull-up operation is to be completed. In an embodiment, the time parameter received at 502 is a duration of time within which the pulldown or pull-up operation is to be completed. The time parameter can be received from any suitable input or communication device. In an embodiment, the time parameter received at 502 is entered by a user, for example using an input device 418 or a remote device 424 as described above and shown in FIG. 4. In an embodiment, the time parameter is determined by a remote device and communicated to the controller, for example the time parameter being generated according to software such as scheduling, telematics, and/or fleet management software.

A desired temperature or range of temperatures is obtained at 504. The desired temperature or range of temperatures can be a set point for the conditioned space, a set point having acceptable deviation values, a defined range of desired temperatures, or any other suitable expression of temperatures which the conditioned space is to reach for use, for example to transport refrigerated goods, passengers, or the like. The desired temperature or range of temperatures can be obtained at 504 by, for example, retrieving the desired temperature or range of temperatures from memory, receiving the desired temperature or range of temperatures from a source such as an input device or a remote device, determining the desired temperature based on information such as cargo information, or the like. The desired temperature or range of temperatures obtained at 504 can be the target to which the conditioned space is to be pulled down or up to in accordance with the time parameter received at 502.

A pulldown or pull-up trajectory is determined at 506. The pulldown or pull-up trajectory can be determined 506 based on a model of the conditioned space and the time parameter received at 502. The pulldown or pull-up trajectory is determined such that the desired temperature or range of temperatures obtained at 504 is achieved in the conditioned space. The pulldown trajectory can be temperatures over time as the conditioned space is pulled down or up to achieve the desired temperature or range of temperatures obtained at 504, such as a setpoint for temperature of the conditioned space. The pulldown trajectory can be a trajectory that achieves the completion of the pulldown or pull-up operation in accordance with the time parameter received at 502. In an embodiment, the pulldown trajectory is determined so as to achieve the completion of the pulldown or pull-up operation at the time provided as the time parameter received at 502. In an embodiment, the pulldown trajectory is determined so as to achieve the completion of the pulldown or pull-up operating within a period of time that is provided as the time parameter received at 502. In an embodiment, the trajectory determined at 506 is a trajectory selected from a plurality of trajectories that are capable of completing the pulldown or pull-up operation in accordance with the time parameter received at 502. The selected trajectory to be used as the trajectory determined at 506 can be selected based on energy efficiency. Energy efficiency of a particular trajectory can be determined based on the required operations of the transport climate control system, such as speeds or capacities at which heaters, compressors, fans, or the like may be operated and the corresponding power consumption of such operations. Energy efficiency can further be improved by preventing the system from arriving at the target temperature or range of temperatures prematurely. Energy efficiency can be improved by avoiding saturation of the actuators used to achieve the temperature change in the conditioned space, for example avoiding maximization of compressor and/or engine operation during the trajectory for the pulldown or pull-up operation.

The determination of the trajectory at 506 can be based on a model of the conditioned space, and its response to operation of the transport climate control system. The model can further incorporate conditions at or around the conditioned space, such as ambient temperatures, wind, solar intensity and the like. The model of the conditioned space can be a dynamic model. One non-limiting example of a dynamic model of the conditioned space that can be used in determining the trajectory at 506 can be an equation such as a differential equation. The order of the differential equation can be selected based on the fit between the equation and the dynamics of the conditioned space and its response to operation of the transport climate control system. A non-limiting example of such an equation can be the following first-order ordinary differential equation:

$$\Delta Q = Q_{in} - Q_{out}$$

$$C_{box}\dot{T}_{box} = Q_{reefer} - UA(T_{box} - T_{ambient})$$

A solution to the example first-order differential equation model for temperature at a particular time thus is:

$$T_{box}(t) = T_{ambient} - \frac{Q_{reefer}}{UA}(1 - e^{\frac{-UAt}{C}})$$

Where: $T_{box}(0) = T_{ambient}$, and $\lim_{t \to \infty} T(t) = T_{ambient} + \frac{Q_{reefer}}{UA}$ In the above equations, the symbols represent the following:
T—Temperature
ΔT—Temperature difference
$T_{Amb}$—Ambient temperature
τ—Exponential time constant
t—Time
Q—Heating or Cooling, heat flux
UA—Heat transfer coefficient times area (represents how easily heat is transferred into/out of the box)
$C_{box}$—Heat capacity of the conditioned space Q, the heat flux of heating or cooling is a function of the operations of the transport climate control system. Thus, the Q values for a particular trajectory correspond to operations of the transport climate control system for that trajectory. It is understood that any suitable model of the conditioned space and its temperature response to operations of the transport climate control system can be used to determine trajectories, and the energy cost of the trajectories can be determined based on the operations of the transport climate control system to achieve that trajectory.

The transport climate control system is operated according to the determined trajectory at 508. The controller can direct operation of one or more components of a transport climate control system to carry out the pulldown or pull-up operation according to the determined trajectory. The operations of components of the transport climate control system such as compressors, fans, heaters, and the like can be controlled to adjust the temperature of the conditioned space in accordance with the determined pulldown or pull-up trajectory determined at 506. Operation of the transport climate control system can include controlling the operational setting of components including, as non-limiting examples, heaters such as heater 426, compressors such as compressor 404 including through variable-frequency drive 414, and/or fans such as fans 412. The operational settings can include particular speed or capacity settings appropriate for each component and the control options thereof.

Optionally, method 500 can include determining an expected completion time at 510. The expected completion time can be determined using the models used to determine the trajectory at 508 to solve for time to achieve the desired temperature or range of temperatures under specific operating conditions for the transport climate control system. For determining the expected completion time, the specific operating conditions can include operating conditions for the transport climate control system that provide maximum rate of heating or cooling, or predetermined settings based on user settings, for example based on user tolerances for energy consumption, wear, or the like. In an embodiment, the specific operating conditions can be the operating conditions to achieve the trajectory determined at 506. The expected completion time can be compared to the time parameter received at 502 or a specific time derived therefrom to determine if the pulldown or pull-up operation will be completed prior to, at, or after the specific time for completion provided by or derived from the time parameter received at 502.

Optionally, a notification can be directed to be presented at 512. The notification can be presented, for example, when the expected completion time determined at 510 does not satisfy the time parameter received at 502, such as when the pulldown or pull-up operation cannot be completed at or prior to the completion time provided by the time parameter. The notification can be supplied to an output device included in the system performing method 500, such as output device 420, or to a remote device such as remote device 424 by way of remote device interface 422. In an embodiment, the notification can include a prompt requesting a response, such as whether to continue with the pulldown or pull-up operation when the time parameter cannot be satisfied. In such an instance, a user response may allow the method 500 to proceed to operation of the transport climate control system according to the determined trajectory.

Optionally, a starting time for the operation of the transport climate control system can be controlled at 514. For example, when the determined trajectory would arrive at the desired temperature or range of temperatures prior to the time at which the pulldown or pull-up operation is to be completed according to the time parameter received at 502, a delay can be provided before operation of the transport climate control system at 508 such that the pulldown or pull-up operation is completed at the desired time. The delay can be such that time spent maintaining the desired temperature or range of temperatures prior to the desired time is reduced or minimized, thus avoiding unnecessary energy consumption from such maintenance of the desired temperature prior to the time at which the desired temperature is requested.

Optionally, method 500 can include receiving temperature data for the conditioned space during the pulldown or pull-up operation 516. The temperature data can be from the conditioned space itself, for example from one or more temperature sensors located in the conditioned space, or can be data related to the temperature in the conditioned space such as return air temperature for air received at the transport climate control system, measured at a return air sensor such as return air sensor 430.

Optionally, method 500 includes adjusting the pulldown or pull-up trajectory 518. If the temperature data received at 516 deviates from the expected temperatures for the trajectory determined at 506, the trajectory can be adjusted to account for the deviation and continue the pulldown or pull-up operation. The adjustment can include, for example, an increase or decrease to the rate of heating or cooling based on the direction in which the temperature deviates from the expected temperature, or a recalculation of the trajectory based on the current state of the conditioned space. In an embodiment, the adjustment can be iterative over the pulldown or pull-up operation. In an embodiment, the adjustment can be performed when triggered by deviation from the expected temperature that exceeds a particular threshold. In an embodiment, the adjustment can be made at 518 following completion of the pulldown or pull-up operation to provide a trajectory for use in subsequent operations.

Optionally, method 500 includes updating the model of the conditioned space 520. The updates to the model can be based on the temperature data received at 516. Deviation of the temperature data from for the conditioned space from expected temperatures for the trajectory can be indicative of inaccuracy of the model, for example due to changes in the transport climate control system such as wear, need for maintenance, or the like, or due to errors in other inputs such as ambient conditions or their effects on the conditioned space. Updating the model can include adjusting model parameters to fit model outputs to the actual temperature response of the conditioned space, for example by changing parameters such as weights, scalars, constants, or the like to improve the extent to which the model of the conditioned space reflects the response of the conditioned space to operation of the transport climate control system under particular conditions. For example, degradation of the insulation of a conditioned space can be accounted for in the model by adjusting the UA parameter (the heat transfer coefficient times area parameter) of the model representative of heat transfer into or out of the conditioned space to correspond to the observed behavior of the conditioned space during the pulldown or pull-up operation. By operating the transport climate control system according to specific operating parameters based on the trajectory determined at 508 and observing the actual response of the conditioned space using temperature data obtained at 516, the response characteristics of the conditioned space can be learned over multiple iterations of the method 500 to refine and improve the modeling of that conditioned space and thus the determination of trajectories in subsequent iterations of the method 500.

Figure 4:
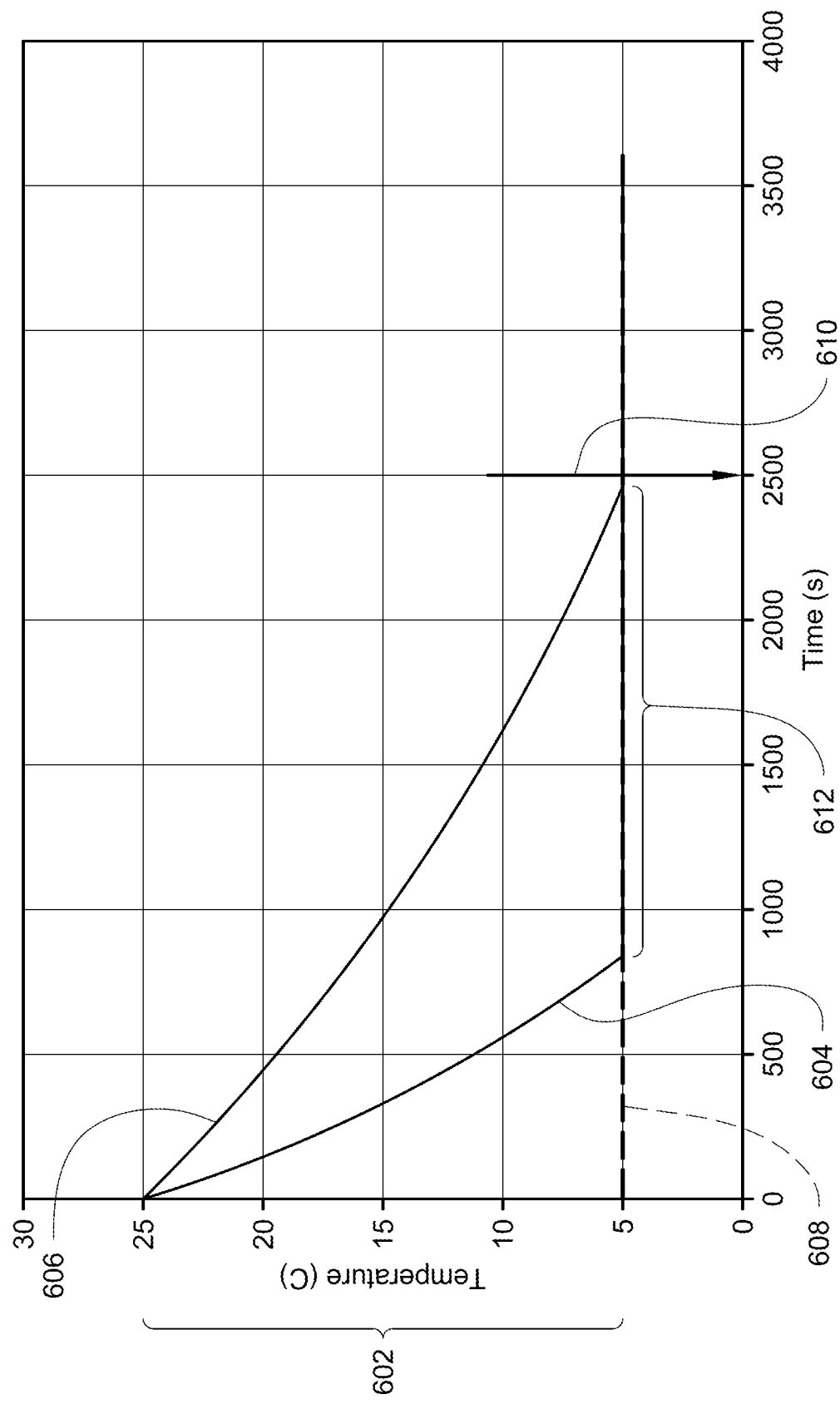
FIG. 4 shows a graph of pulldown trajectories according to an embodiment.

FIG. 4 shows a graph of pulldown trajectories according to an embodiment. In FIG. 4, a pulldown amount 602 can be seen along the Y-axis which corresponds to a distance from the current temperature of the conditioned space to a targeted setpoint temperature 608. The X-axis corresponds to time. The pulldown operation has a completion time 610. The completion time 610 can correspond to a time parameter used in determining the pulldown trajectory. The completion time 610 can be, for example, a specific time when the operation must be completed, for example due to timing of scheduled routes or the like or a duration from an initiation point by which the operation must be completed. The first trajectory 604 shows a pulldown according to previous pulldown logic which proceeds to the setpoint aggressively and then maintains the setpoint after it has been reached, until the designated time is reached at the end of the X-axis. The second trajectory 606 shows a pulldown according to an embodiment, where the pulldown is performed relatively gradually such that the operation is completed at the specific time the pulldown is to be completed. By controlling transport climate control system operations based on the time parameter, operations according to second trajectory 606 can be more gentle and require less intense operations of the transport climate control system such as high fan speeds and/or high compressor speeds or operating capacities, thus saving energy and potentially reducing wear compared to operations to achieve the first trajectory 604. Further energy efficiency can be realized by eliminating the need to maintain temperatures at the setpoint during period 612 from completion of the pulldown until use of the conditioned space at the specific time defined by the time parameter.

ASPECTS

It is understood that any of aspects 1-7 can be combined with any of aspects 8-20.

Aspect 1. A method of controlling a transport climate control system, comprising:
  receiving a time parameter for a pulldown or pull-up operation of the transport climate control system;
  determining a pulldown or pull-up trajectory based on a model of a conditioned space of the transport climate control system and the time parameter; and
  operating the transport climate control system based on the determined pulldown or pull-up trajectory to perform the pulldown or pull-up operation.

Aspect 2. The method according to aspect 1, further comprising determining an estimated completion time for the pulldown or pull-up operation.

Aspect 3. The method according to aspect 2, further comprising directing the presentation of a notification when the estimated completion time is later than the time parameter.

Aspect 4. The method according to any of aspects 2-3, further comprising delaying the operating of the transport climate control system when the estimated completion time is earlier than the time parameter.

Aspect 5. The method according to any of aspects 1-4, further comprising receiving temperature data from the conditioned space during the pulldown or pull-up operation.

Aspect 6. The method according to aspect 5, further comprising adjusting the pulldown or pull-up trajectory based on the temperature data.

Aspect 7. The method according to any of aspects 5-6, further comprising updating the model of the conditioned space based on the temperature data.

Aspect 8. A system for controlling pulldown or pull-up a temperature of a conditioned space, comprising:
  a transport climate control system configured to affect a temperature of the conditioned space of a transport unit; and
  a controller configured to:
  receive a time parameter for a pulldown or pull-up operation for the conditioned space;
  determine a pulldown or pull-up trajectory based on a model of the conditioned space and the time parameter; and
  direct operation of the transport climate control system based on the determined pulldown or pull-up trajectory so as to perform the pulldown or pull-up operation.

Aspect 9. The system according to aspect 8, wherein the controller is further configured to determine, based on the model of the conditioned space, an estimated completion time for the pulldown or pull-up operation.

Aspect 10. The system according to aspect 9, wherein the controller is further configured to direct presentation of a notification to a user when the estimated completion time is later than the time parameter.

Aspect 11. The system according to any of aspects 9-10, wherein the controller is further configured to delay operation of the transport climate control system when the estimated completion time is earlier than the time parameter.

Aspect 12. The system according to any of aspects 8-11, wherein the controller is further configured to receive temperature data from the conditioned space during the pulldown or pull-up operation.

Aspect 13. The system according to aspect 12, wherein the controller is further configured to adjust the pulldown or pull-up trajectory based on the received temperature data.

Aspect 14. The system according to any of aspects 12-13, wherein the controller is further configured to update the model of the conditioned space based on the received temperature data.

Aspect 15. The system according to any of aspects 8-14, wherein directing the operation of the transport climate control system includes setting a speed for a compressor included in the transport climate control system.

Aspect 16. The system according to any of aspects 8-15, wherein directing the operation of the transport climate control system includes setting a speed for a fan of an evaporator included in the transport climate control system.

Aspect 17. The system according to any of aspects 8-16, wherein the determining of the pulldown or pull-up trajectory is further based on at least one ambient condition of the conditioned space.

Aspect 18. The system according to any of aspects 8-17, wherein the conditioned space is an interior of a trailer.

Aspect 19. The system according to any of aspects 8-17, wherein the conditioned space is a cargo compartment of a truck.

Aspect 20. The system according to any of aspects 8-17, wherein the conditioned space is a passenger compartment of a bus.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of controlling a transport climate control system, comprising:
a controller receiving a time parameter for a pulldown or pull-up operation of the transport climate control system, wherein the time parameter is one of a period of time over which the pulldown or pull-up operation is to be completed or a specific time by which the pulldown or pull-up operation is to be completed;
the controller determining a pulldown or pull-up trajectory based on a model of a response of a conditioned space to operation of the transport climate control system and the time parameter, wherein determining the pulldown or pull-up trajectory is based on an energy efficiency over the course of completing the pulldown or pull-up operation according to the time parameter; and
the controller operating the transport climate control system based on the determined pulldown or pull-up trajectory to perform the pulldown or pull-up operation.

2. The method of claim 1, further comprising the controller determining an estimated completion time for the pulldown or pull-up operation.

3. The method of claim 2, further comprising the controller directing the presentation of a notification when the estimated completion time is later than the time parameter.

4. The method of claim 2, further comprising the controller delaying the operating of the transport climate control system when the estimated completion time is earlier than the time parameter.

5. The method of claim 1, further comprising the controller receiving temperature data from the conditioned space during the pulldown or pull-up operation.

6. The method of claim 5, further comprising the controller adjusting the pulldown or pull-up trajectory based on the temperature data.

7. The method of claim 5, further comprising the controller updating the model of the conditioned space based on the temperature data by adjusting model parameters to fit the temperature data.

8. The method of claim 1, wherein determining the pulldown or pull-up trajectory is based on energy efficiency over the course of completing the pulldown or pull-up operation according to the time parameter.

9. A system for controlling pulldown or pull-up of a temperature of a conditioned space, comprising:
a transport climate control system configured to control a temperature of the conditioned space of a transport unit; and
a controller configured to:
receive a time parameter for a pulldown or pull-up operation for the conditioned space, wherein the time parameter is one of a period of time over which the pulldown or pull-up operation is to be completed or a specific time by which the pulldown or pull-up operation is to be completed;
determine a pulldown or pull-up trajectory based on a model of a response of the conditioned space to operation of the transport climate control system and the time parameter, wherein determining the pulldown or pull-up trajectory is based on an energy efficiency over the course of completing the pulldown or pull-up operation according to the time parameter, and
direct operation of the transport climate control system based on the determined pulldown or pull-up trajectory so as to perform the pulldown or pull-up operation.

10. The system of claim 9, wherein the controller is further configured to determine, based on the model of the conditioned space, an estimated completion time for the pulldown or pull-up operation.

11. The system of claim 10, wherein the controller is further configured to direct presentation of a notification to a user when the estimated completion time is later than the time parameter.

12. The system of claim 10, wherein the controller is further configured to delay operation of the transport climate control system when the estimated completion time is earlier than the time parameter.

13. The system of claim 9, wherein the controller is further configured to receive temperature data from the conditioned space during the pulldown or pull-up operation.

14. The system of claim 13, wherein the controller is further configured to adjust the pulldown or pull-up trajectory based on the received temperature data.

15. The system of claim 13, wherein the controller is further configured to update the model of the conditioned space based on the received temperature data by adjusting model parameters to fit the received temperature data.

16. The system of claim 9, wherein directing the operation of the transport climate control system includes setting a speed for a compressor included in the transport climate control system.

17. The system of claim 9, wherein directing the operation of the transport climate control system includes setting a speed for a fan/blower of an evaporator included in the transport climate control system.

18. The system of claim 9, wherein the determining of the pulldown or pull-up trajectory is further based on at least one ambient condition of the conditioned space.

19. The system of claim 9, wherein the controller is configured to determine the pulldown or pull-up trajectory based on energy efficiency over the course of completing the pulldown or pull-up operation according to the time parameter.

20. The system of claim 15, wherein the model parameters include a parameter representative of heat transfer into or out of the conditioned space.

* * * * *